(12) United States Patent
Lundberg (10) Patent No.: US 12,392,269 B2
(45) Date of Patent: Aug. 19, 2025

(54) CONTROL DEVICE AND METHOD FOR DERIVING ENGINE-OUT NOx CONCENTRATION

(71) Applicant: Scania CV AB, Södertälje (SE)

(72) Inventor: Christer Lundberg, Rönninge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/710,232

(22) PCT Filed: Nov. 18, 2022

(86) PCT No.: PCT/SE2022/051075
§ 371 (c)(1),
(2) Date: May 15, 2024

(87) PCT Pub. No.: WO2023/091071
PCT Pub. Date: May 25, 2023

(65) Prior Publication Data
US 2025/0035024 A1    Jan. 30, 2025

(30) Foreign Application Priority Data

Nov. 22, 2021  (EP) .................................... 21209443

(51) Int. Cl.
*F01N 3/20* (2006.01)
*F01N 9/00* (2006.01)
*F01N 11/00* (2006.01)

(52) U.S. Cl.
CPC ............. *F01N 3/2066* (2013.01); *F01N 9/00* (2013.01); *F01N 11/00* (2013.01); *F01N 2560/026* (2013.01); *F01N 2900/1402* (2013.01)

(58) Field of Classification Search
CPC .......... F01N 3/2066; F01N 9/00; F01N 11/00; F01N 2560/026; F01N 2900/1402
See application file for complete search history.

(56) References Cited

U.S. PATENT DOCUMENTS

| | | | |
|---|---|---|---|
| 9,109,493 B2 * | 8/2015 | Lin | ................ F02D 41/0275 |
| 10,167,762 B2 | 1/2019 | Wang et al. | |

(Continued)

FOREIGN PATENT DOCUMENTS

| | | |
|---|---|---|
| EP | 3615775 B1 | 3/2021 |
| WO | 2014070248 A1 | 5/2014 |

OTHER PUBLICATIONS

Scania CV AB, International Patent Application No. PCT/SE2022/051075, International Search Report, Feb. 10, 2023.

(Continued)

*Primary Examiner* — Brandon D Lee
(74) *Attorney, Agent, or Firm* — Moore & Van Allen PLLC; W. Kevin Ransom (57) ABSTRACT

A control device and a method for deriving an engine-out NOx concentration in an exhaust system comprising a SCR catalyst, a dosing device for dosing a reductant, a first NOx sensor arranged downstream of the dosing device and a second NOx sensor arranged downstream the SCR catalyst. The method comprises deriving engine-out NOx concentration based on a first concentration reading obtained from the first NOx sensor and a second concentration reading obtained from the second NOx sensor, said first concentration reading being obtained while the dosing device is in operation. An exhaust system as well as a vehicle comprising the control device are also provided.

13 Claims, 3 Drawing Sheets

(56) References Cited

U.S. PATENT DOCUMENTS

| | | |
|---|---|---|
| 11,015,508 B2 | 5/2021 | Halldorf et al. |
| 2013/0298655 A1 | 11/2013 | Kowalkowski et al. |
| 2014/0056790 A1 | 2/2014 | Geveci et al. |
| 2014/0360166 A1* | 12/2014 | Chandrasekaran ... F02D 41/222 60/274 |
| 2015/0128565 A1 | 5/2015 | Upadhyay et al. |
| 2015/0361846 A1* | 12/2015 | Haas ................. F01N 3/208 60/274 |
| 2021/0087958 A1* | 3/2021 | Uehara ............... F01N 3/208 |
| 2024/0052760 A1* | 2/2024 | Mills ................. F01D 25/30 |

OTHER PUBLICATIONS

Scania CV AB, International Patent Application No. PCT/SE2022/051075, Written Opinion, Feb. 10, 2023.
Scania CV AB, European Patent Application No. 21209443.7, Extended European Search Report, May 3, 2022.

* cited by examiner

CONTROL DEVICE AND METHOD FOR DERIVING ENGINE-OUT NOx CONCENTRATION

CROSS-REFERENCE TO RELATED APPLICATIONS

This application is a National Stage Patent Application (filed under 35 § U.S.C. 371) of PCT/SE2022/051075, filed Nov. 18, 2022, of the same title, which, in turn claims priority to European Patent Application No. 21209443.7 filed Nov. 22, 2021, of the same title; the contents of each of which are hereby incorporated by reference.

TECHNICAL FIELD

The present disclosure relates in general to a method for deriving an engine-out NOx concentration of an exhaust gas stream in an exhaust system configured to treat exhaust gas from a combustion engine. The present disclosure further relates in general to a control device configured to derive an engine-out NOx concentration of an exhaust gas stream in an exhaust system configured to treat exhaust gas from a combustion engine. The present disclosure further relates in general to a computer program as well as a computer-readable medium. Moreover, the present disclosure relates in general to an exhaust system as well as a vehicle.

BACKGROUND

An exhaust system, such as an exhaust gas aftertreatment system of a vehicle, may comprise various catalysts and filters configured to treat the exhaust gas so as to arrive at a desired tailpipe composition. The tailpipe composition is released into the surrounding environment and must thus fulfil the requirements of current legislation, or other standards, regarding emissions. Such legislation or standards typically specify maximum levels for a number of tailpipe pollutants including carbon monoxide (CO), hydrocarbons (HC), nitrogen oxides (NOx) and particulate matter (PM). NOx comprises $NO_2$ and NO.

Certain legislation within the automotive industry may also require that engine-out NOx concentration (i.e. the NOx concentration in the exhaust gas leaving the engine) is essentially continuously determined. Therefore, there is a need to enable determining the engine-out NOx.

Selective catalytic reduction (SCR) is an effective technology to reduce tailpipe nitrogen oxides (NOx) emissions. It involves adding a reductant, such as ammonia, to the exhaust gas stream. The reductant, with the aid of a catalyst, reduces NOx in the exhaust gas stream to nitrogen gas ($N_2$) and water. In practical implementations in vehicles, an aqueous urea solution is used as a reductant and this urea solution is decomposed to ammonia and carbon dioxide in the hot exhaust gas stream.

A difficulty with SCR is the requirement for efficient mixing in the exhaust gas in order to achieve uniform distribution of reductant over the entire surface area of the SCR catalyst. The space available in the exhaust system for mixing the reductant with the exhaust gas stream is extremely limited and the reductant is usually injected shortly upstream of the SCR catalyst. In order to improve mixing, a mixing device (often resembling a turbine blade) may be arranged in the exhaust pipe. However, even when using a mixing device, it is difficult to achieve sufficiently uniform mixing. Moreover, the presence of a mixing device in the exhaust pipe may act as an obstruction to flow, causing higher pressure upstream of the mixing device (backpressure) and thereby reducing the engine efficiency.

Therefore, systems have been developed wherein injection of the reductant is performed to a turbocharger turbine such that the rotational motion of the turbine may be utilized in order to improve the dispersion of reductant in the exhaust gas stream and thus over the surface of the SCR catalyst. One example of such a solution is described in U.S. Pat. No. 11,015,508 B2, which discloses a dosing system for a turbocharger turbine of an exhaust system for a combustion engine, the dosing system comprising a distribution device and a metering device. The distribution device comprises a receiving surface, and at least one distribution surface. The receiving surface is equipped to receive exhaust additive dosed to the distribution device. The distribution surface is in fluid communication with the receiving surface and is equipped to distribute exhaust additive in an exhaust stream passing through the turbocharger turbine by a rotary motion of the distribution device.

Although dosing of reductant to the turbocharger presents significant advantages in the reduction of NOx in the exhaust gas as a result of the improved dispersion of the reductant, it has a disadvantage of not enabling arranging a NOx sensor upstream of the dosing of reductant. Instead, the NOx sensor has to be arranged downstream of the dosing of the reductant. This in turn results in that an engine-out NOx concentration cannot be accurately measured since the conventionally used NOx sensors are not able to distinguish between ammonia and NOx. In other words, in case the NOx sensor is arranged downstream of the dosing of the reductant, the cross sensitivity of the NOx sensor to the reductant results in that the engine-out NOx cannot be directly measured by said NOx sensor.

It is previously known to model engine-out NOx concentration, for example based on readings from a NOx sensor arranged downstream of the SCR and/or knowledge of other parameters, such as parameters relating to the operation of the combustion engine. However, such a modelled value of engine-out NOx concentration may not be sufficiently accurate to meet the legislation in certain jurisdictions.

US 2014/360166 A1 discloses a system comprising a first NOx sensor, arranged upstream of a SCR catalyst, which may be used for determining engine-out NOx. The system further comprises a second NOx sensor, arranged downstream of the SCR, which may be used for determining system-out NOx. The first NOx sensor may be arranged upstream or downstream of a reductant injector. In case the first NOx sensor is positioned where a portion or all of the injected reductant is expected to hydrolyze into ammonia, the effect of the ammonia amount may be estimated and subtracted from the first NOx sensor indicated engine-out NOx amount. However, estimating the effect of the ammonia amount on the first NOx sensor is difficult, and relying on such an estimation increases the risk for errors in the determination of engine-out NOx.

SUMMARY

The object of the present invention is to provide an improved method for deriving an engine-out NOx concentration in an exhaust system where it is difficult or impossible to arrange a NOx sensor upstream of the dosing of a reductant for a selective catalytic reduction catalyst of the exhaust system.

The object is achieved by the subject-matter of the appended independent claim(s).

In accordance with the present disclosure, a method, performed by a control device, for deriving an engine-out NOx concentration of an exhaust gas stream in an exhaust system configured to treat exhaust gas from a combustion engine is provided. Said exhaust system comprises a selective catalytic reduction catalyst and a dosing device adapted for injecting a reductant into the exhaust gas stream. The exhaust system further comprises a first NOx sensor arranged downstream of the dosing device but upstream of the selective catalytic reduction catalyst, and a second NOx sensor arranged downstream of the selective catalytic reduction catalyst. The method comprises a step of deriving engine-out NOx concentration based on a first concentration reading obtained from the first NOx sensor and a second concentration reading obtained from the second NOx sensor, said first concentration reading being obtained while the dosing device is in operation so as to introduce reductant into the exhaust gas stream.

The present method allows for deriving engine-out NOx concentration based on actually measured concentration parameters, and therefore increases the accuracy in the derived engine-out NOx concentration compared to for example merely modelled engine-out NOx concentration. Therefore, the present method enables meeting the requirements of determining engine-out NOx concentration with a relatively high accuracy also in exhaust systems where the engine-out NOx concentration cannot be measured directly by a single NOx sensor. More specifically, the present method enables determining engine-out NOx concentration with a higher accuracy than previously possible in exhaust systems where a NOx sensor is arranged downstream of the dosing device.

The exhaust system may further comprise a turbocharger arranged upstream of the catalytic reduction catalyst, and the dosing device may be adapted for injecting the reductant towards the turbocharger, or in the turbocharger, such that the reductant is dispersed in the exhaust gas stream by usage of a rotational motion of a turbine of the turbocharger. Such an exhaust system enables an improved dispersion and evaporation of the reductant, and thereby improves the efficiency in the conversion of NOx in the exhaust system. However, in such an exhaust system, a NOx sensor configured to directly determine the engine-out NOx concentration cannot be arranged upstream of the dosing device and a reading of a concentration of NOx from a NOx sensor arranged upstream of the SCR will therefore inherently be affected by the dosed reductant due to its cross-sensitivity thereto. Thus, the present method for deriving engine-out NOx is particularly suitable for such exhaust systems.

The first NOx sensor may be arranged at a position in the exhaust where it is expected that the reductant is evaporated. This may further increase the accuracy in the concentration reading obtained from the first NOx sensor, and hence the accuracy in the derived engine-out NOx concentration.

The step of deriving engine-out NOx concentration based on the first concentration reading and the second concentration reading may be performed by also taking into account a controlled amount of reductant introduced into the exhaust gas stream via the dosing device. Thereby, the accuracy of the derived engine-out NOx concentration is increased. This is a result of reducing the effect of possible errors in the first and second concentration readings as well as taking into account that all of the reductant contributing to the first concentration reading as a result of the cross-sensitivity of the first NOx sensor may not necessarily be consumed in the SCR.

Moreover, the step of deriving engine-out NOx concentration based on the first concentration reading and the second concentration reading may be performed while taking into account a predetermined constant representing the sensitivity of the first NOx sensor to the reductant. Thereby, the accuracy of the derived engine-out NOx concentration is increased.

According to one aspect, the first concentration reading may be obtained from the first NOx sensor at a first point in time, and the second concentration reading may be obtained from the second NOx sensor at a second point in time, and wherein the second point in time is after a time, corresponding to an estimated time for the exhaust gas stream to travel from the first NOx sensor to the second NOx sensor, has elapsed since the first point in time. Thereby, the time it takes for the exhaust gas to flow from the first NOx sensor, via the selective catalytic reduction catalyst, to the second NOx sensor may be taken into account.

The exhaust system may further comprise an ammonia slip catalyst arranged downstream of the selective catalytic reduction catalyst. Such an ammonia slip catalyst may be arranged upstream of the second NOx sensor. Such an ammonia slip catalyst may convert any possible excess ammonia leaving the selective catalytic reduction catalyst and thereby increases the accuracy in the reading of a NOx concentration by the second NOx sensor. This in turn leads to a higher accuracy in the derived engine-out NOx concentration.

The present disclosure further relates to a computer program comprising instructions which, when executed by a control device, cause the control device to carry out the method as described above.

The present disclosure further relates to a computer-readable medium comprising instructions which, when executed by a control device, cause the control device to carry out the method as described above.

Moreover, the present disclosure provides a control device configured to derive an engine-out NOx concentration of an exhaust gas stream in an exhaust system configured to treat exhaust gas from a combustion engine. Said exhaust system comprises a selective catalytic reduction catalyst, a dosing device adapted for injecting a reductant into the exhaust gas stream, a first NOx sensor arranged downstream of the dosing device but upstream of the selective catalytic reduction catalyst, and a second NOx sensor arranged downstream of the selective catalytic reduction catalyst. The control device is configured to derive engine-out NOx concentration based on a first concentration reading obtained from the first NOx sensor and a second concentration reading obtained from the second NOx sensor, said first concentration reading being obtained while the dosing device is in operation so as to introduce reductant into the exhaust gas stream.

The control device provides the same advantages as described above with reference to the corresponding method for deriving an engine-out NOx concentration of an exhaust gas stream in an exhaust system configured to treat exhaust gas from a combustion engine.

The control device may further be configured to take into account a controlled amount of reductant introduced into the exhaust gas stream via the dosing device when deriving the engine-out NOx concentration based on the first concentration reading obtained from the first NOx sensor and the second concentration reading obtained from the second NOx sensor.

The present disclosure further provides an exhaust system configured to treat exhaust gas from a combustion engine.

The exhaust system comprises a selective catalytic reduction catalyst, a dosing device adapted for dosing a reductant, a first NOx sensor arranged downstream of the dosing device but upstream of the selective catalytic reduction catalyst, and a second NOx sensor arranged downstream of the selective catalytic reduction catalyst. The exhaust system further comprises the control device configured to derive an engine-out NOx concentration of an exhaust gas stream in an exhaust system configured to treat exhaust gas from a combustion engine as described above.

Moreover, the present disclosure further relates to a vehicle comprising the control device configured to derive an engine-out NOx concentration of an exhaust gas stream in an exhaust system configured to treat exhaust gas from a combustion engine. The vehicle may further comprise a combustion engine and an exhaust system. Said exhaust system may comprise at least a selective catalytic reduction catalyst and a dosing device adapted for dosing a reductant.

DETAILED DESCRIPTION

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

When the terms "upstream" and "downstream", respectively, are used in the present disclosure, they shall be considered to be in relation to the intended direction of flow of exhaust gas through the exhaust system. The intended direction of flow through the exhaust system is from a first end thereof, configured to be connected to a combustion engine, to a second end from which the exhaust gas may be let out to the surroundings.

The term "concentration reading", as used in the present disclosure, is intended to mean a reading of a concentration of one or more constituent components in a mixture, such as a gas mixture. Such a reading is obtained by usage of a sensor configured to determine concentration of said one or more constituent components. It should here be recognized that such a sensor is generally configured to determine concentration of only one constituent component, but may also be sensitive to other constituent components of the mixture. For said reason, the term "concentration reading" shall be considered to mean the concentration reading corresponding to the sum of the contribution of the constituent component, for which the concentration should be determined, and the contribution from any other sources that the sensor may be cross-sensitive to.

Furthermore, a NOx sensor is in the present disclosure considered to mean a sensor intended to determine concentration of NOx in a gas mixture, such as exhaust gas.

The present disclosure provides a method for deriving an engine-out NOx concentration of an exhaust gas stream in an exhaust system configured to treat exhaust gas from a combustion engine. The exhaust system comprises a selective catalytic reduction (SCR) catalyst and a dosing device adapted for injecting a reductant into the exhaust gas stream upstream of the selective catalytic reduction catalyst. The exhaust system further comprises a first NOx sensor arranged downstream of the dosing device. More specifically, the first NOx sensor is arranged downstream of a position of injection of reductant into the exhaust gas stream, said injection of reductant being performed by means of the dosing device. Moreover, the first NOx sensor is arranged upstream of the SCR. In other words, the first NOx sensor is arranged between the dosing device and the SCR. The exhaust system furthermore comprises a second NOx sensor which is arranged downstream of the SCR. The herein described method for deriving engine-out NOx comprises a step of deriving engine-out NOx concentration based on a first concentration reading obtained from the first NOx sensor and a second concentration reading obtained from the second NOx sensor. Said first concentration reading is obtained while the dosing device is in operation, and hence is introducing reductant into the exhaust gas stream.

The first concentration reading constitutes a concentration reading corresponding to the sum of the concentration of NOx (which due to the position of the first NOx sensor corresponds to the engine-out NOx concentration) and any contribution from other sources that the first NOx sensor may be cross-sensitive to. More specifically, the first concentration reading may constitute a concentration reading corresponding to the sum of the concentration of NOx and the contribution of the reductant to the concentration reading of NOx as a result of the cross-sensitivity of the first NOx sensor to the reductant. In contrast, the second concentration reading obtained from the second NOx sensor may be assumed not to be affected by the reductant since the reductant is generally dosed so as to be consumed by the conversion of NOx in the SCR.

The fact that the first concentration reading obtained from the first NOx sensor is obtained while the dosing device is in operation means that the present method is performed while the exhaust system is operated under normal operating conditions so as to reduce the amount of NOx in the exhaust gas before it is let out to the surroundings. In other words, the present method does not require any interruption in the intended normal operation of the exhaust system or the combustion engine whose exhaust gas the exhaust system is configured to treat. More specifically, the present method is intended to be performed while dosing of reductant is performed, by means of the dosing device, so as to arrive at a desired concentration of NOx downstream of the first SCR.

The present method is performed in an exhaust system where the first NOx sensor is arranged downstream of the dosing device configured to inject a reductant to the SCR catalyst. In such exhaust systems, there is thus a risk of the first NOx sensor not reading a "true" value of the NOx concentration in the exhaust gas as a result of its cross-sensitivity to the reductant. Here it should be noted that the SCR catalyst may be the very first catalyst that the exhaust gas passes in the exhaust system, although other configurations of the exhaust system may also be plausible (albeit less preferred when the present method is to be performed). In exhaust systems where a NOx sensor may be arranged upstream of the dosing device to the SCR catalyst such that an engine-out NOx concentration may be determined without risk of being affected by the reductant, there is no need for the present method to be performed.

Examples of situations where a NOx sensor for the purpose of determining engine-out NOx concentration cannot be arranged upstream of the dosing device include exhaust systems where the dosing device is adapted to inject the reductant at a turbocharger. One example of such an exhaust system is described in the previously mentioned U.S. Pat. No. 11,015,508 B2. In systems where dosing of the reductant is performed at the turbocharger, there is generally no possibility of arranging a NOx sensor upstream of the turbocharger due to the pressure. Therefore, the herein described method for deriving engine-out NOx may be particularly advantageous in such exhaust systems.

Thus, in accordance with one embodiment of the present disclosure, the exhaust system further comprises a turbocharger arranged upstream of the selective catalytic reduction catalyst, and the dosing device is configured to inject reductant towards the turbocharger such that the reductant is dispersed in the exhaust gas stream by usage of a rotational motion of the turbine of the turbocharger. Alternatively, the dosing device may be configured to inject reductant in the turbocharger for the same purpose. It should here be noted that the reductant may be directly or indirectly dispersed by usage of the rotational motion of the turbine of the turbocharger as long as the reductant is injected such that at least a part thereof hits a surface which has a rotational motion as a result of the rotational motion of the turbine. Such a surface may be a part of the turbine as such, or alternatively be a surface of a component connected thereto such that the component rotates with the turbine.

The exhaust system may comprise a conduit, generally in the form of a pipe, configured to lead the exhaust gas to the SCR catalyst. The dosing device may be arranged to extend into said conduit through the wall thereof. Thereby, the reductant may be introduced into the exhaust gas stream. A portion of the conduit, more specifically the portion between the dosing device and the SCR, forms an evaporation zone for the reductant. Generally, the extension of said portion is selected to ensure that reductant is evaporated, and essentially homogeneously distributed, when it reaches the SCR such that it is appropriately distributed over the catalytic surface of the SCR. The first NOx sensor may suitably be arranged at a position in the exhaust system where it is expected that the reductant is evaporated, and preferably also essentially homogeneously distributed in the exhaust gas stream. In other words, the first NOx sensor may suitably be arranged downstream of the evaporation zone. This in turn increases the accuracy in the concentration reading of the first NOx sensor and hence the accuracy in the derived engine-out NOx concentration.

The step of deriving engine-out NOx concentration based on the first concentration reading and the second concentration reading may be performed while also taking into account information regarding controlled amount of reductant introduced into the exhaust gas stream via the dosing device. Such information regarding controlled amount of reductant introduced into the exhaust system may for example be derived from a controller configured to control the dosing device. Such a controller may be a part of the herein described control device configured to derive engine-out NOx concentration. For the purpose of deriving the engine-out NOx concentration, the value of the controlled amount of reductant may be converted into an equivalent NOx amount. Such a conversion of an amount of dosed reductant to an equivalent NOx amount is previously known in the art and will therefore not be further described in the present disclosure. By also taking into account the amount of dosed reductant into the exhaust gas stream, it is possible to reduce the effect of potential errors in the first concentration reading and the second concentration reading as well as potential errors in the assumption that all of reductant is consumed in the SCR such that it does not affect the reading in the second NOx sensor.

It should here be noted that a controlled amount of reductant introduced into the exhaust gas stream is here intended to mean the amount of reductant which the controller instructs the dosing device to introduce into the exhaust stream, i.e. the instructed controlled amount of reductant introduced into the exhaust gas stream, since this corresponds to the information that may be easily retrievable by the control device, and in general corresponds well to the actually introduced amount of reductant. However, in case the dosing system does not operate as intended, there may be a difference between the instructed amount and the amount of reductant actually introduced into the exhaust gas stream by the dosing device.

NOx sensors previously known for use in exhaust systems may have different sensitivities to the reductant. More specifically, NOx sensors may have less sensitivity, essentially the same sensitivity, or even higher sensitivity to the reductant compared to the sensitivity of the sensor to the actual NOx in the exhaust gas. Therefore, the step of deriving engine-out NOx concentration based on the first concentration reading and the second concentration reading may suitable be performed while taking into account a predetermined constant representing the sensitivity of the first NOx sensor to the reductant. The constant representing the sensitivity of the first NOx sensor to the reductant may be derived by routine experimental tests, which are within the normal skill of the person skilled in the art of NOx sensors, and will therefore not be further described in the present disclosure. By considering the sensitivity of the first NOx sensor to the reductant, the accuracy in the concentration reading obtained from the first NOx sensor is improved. This in turn improves the accuracy of the derived engine-out NOx concentration.

It takes a certain time for the exhaust gas to flow from the first NOx sensor, via the SCR, to the second NOx sensor. This means that simultaneous readings from the first NOx sensor and the second NOx sensor do not represent the "same" portion of the exhaust gas since the flow causes a time delay. In most situations, this time delay is very short and may, for example for saving computational efforts and/or reducing the risk for errors, be neglected. Especially when the method is used for repeatedly deriving engine-out NOx concentrations at preselected time intervals, this may be neglected. Thus, according to one alternative, the first concentration reading and the second concentration reading, used for deriving the engine-out NOx concentration may be obtained at the same point in time. However, if desired, the duration of the flow between the NOx sensors may also be taken into account. Therefore, according to one embodiment of the herein described method, the first concentration reading is obtained from the first NOx sensor at a first point in time, and the second concentration reading is obtained from the second NOx sensor at a second point in time. Said second point in time is after a time, corresponding to an estimated time for the exhaust gas stream to travel from the first NOx sensor to the second NOx sensor, has elapsed since the first point in time.

The exhaust system may, if desired, further comprise an ammonia slip catalyst (ASC) arranged downstream of the SCR catalyst. Such an ASC may be configured to treat any excess reductant (more specifically ammonia) possibly not consumed in the SCR. If the exhaust system comprises such an ASC, the second NOx sensor may advantageously be arranged downstream of the ASC. This improves the accuracy in the concentration reading of the second NOx sensor and thereby also the accuracy in the derived engine-out NOx concentration.

It should be noted that the herein described method for deriving engine-out NOx concentration may suitably be repeated, for example at predetermined time intervals. Thereby, the engine-out NOx concentration may be monitored over time and the derived engine-out NOx concentrations may be stored for example in a database for possible future use and/or for fulfilling possible legal requirements.

In the following, an example of how to derive the engine-out NOx concentration based on a first concentration reading, $S^*$, obtained from the first NOx sensor and a second concentration reading, $M^*$, obtained from the second NOx sensor will be explained in more detail. In this example, the instructed controlled amount of reductant introduced into the exhaust gas stream, expressed as the NOx-equivalent, $P^*$, is taken into account. The first concentration reading $S^*$ corresponds to the engine-out NOx concentration plus dosed amount of reductant multiplied with the predetermined constant $\beta$ representing the cross-sensitivity of the first NOx sensor to the reductant.

According to the present example, the parameters $P^*$, $S^*$ and $M^*$ may be weighted so as to arrive at the engine-out NOx concentration, E, and the actually dosed amount of reductant, P (expressed as NOx-equivalent), by setting up an overdetermined equation system in matrix form:

$$\begin{pmatrix} P^* \\ M^* \\ S^* \end{pmatrix} \approx \begin{pmatrix} 0 & 1 \\ 1 & -1 \\ 1 & \beta \end{pmatrix} * \begin{pmatrix} E \\ P \end{pmatrix}$$

Solving the above by the least squares method, and assuming that $\beta=1$, gives:

$$\begin{pmatrix} E \\ P \end{pmatrix} \approx \begin{pmatrix} 0 & 1/2 & 1/2 \\ 1/3 & -1/3 & 1/3 \end{pmatrix} * \begin{pmatrix} P^* \\ M^* \\ S^* \end{pmatrix}$$

Albeit the above given example takes into account the dosage of reductant, the method may also be performed in situations where this information is not known (for example due to malfunction of the dosing device or the controller configured to control the amount to be dosed). Assuming that the first NOx sensor has essentially the same sensitivity to the reductant as to NOx and not taking into account the dosage of reductant, the most simple way of deriving engine-out NOx, the derived engine-out NOx would be $E=(S^*+M^*)/2$.

The performance of the herein described method for deriving an engine-out NOx concentration may be governed by programmed instructions. These programmed instructions typically take the form of a computer program which, when executed in or by a control device, cause the control device to effect desired forms of control action. Such instructions may typically be stored on a computer-readable medium.

The present disclosure further relates to a control device configured to derive an engine-out NOx concentration of an exhaust gas stream in accordance with the method described above. The control device may be configured to perform any one of the steps of the method for deriving an engine-out NOx concentration of an exhaust gas stream as described herein.

More specifically, in accordance with the present disclosure, a control device configured to derive an engine-out NOx concentration of an exhaust gas stream in an exhaust system configured to treat exhaust gas from a combustion engine is provided. Said exhaust system comprises at least a selective catalytic reduction catalyst, a dosing device adapted to inject a reductant into the exhaust gas stream, a first NOx sensor arranged downstream of the dosing device but upstream of the selective catalytic reduction catalyst, and a second NOx sensor arranged downstream of the selective catalytic reduction catalyst. Said exhaust system may further comprise a turbocharger. In such a case, the dosing device may be adapted to inject the reductant towards the turbocharger, or in the turbocharger, such that the reductant may be dispersed in the exhaust gas stream by usage of a rotational motion of a turbine of the turbocharger. The control device is configured to derive engine-out NOx concentration based on a first concentration reading obtained from the first NOx sensor, a second concentration reading obtained from the second NOx sensor, and optionally information regarding a controlled amount of reductant introduced into the exhaust gas stream via the dosing device. Said first concentration reading obtained from the first NOx sensor is a reading obtained while the dosing device is in operation so as to introduce reductant into the exhaust gas stream.

Figure 1:
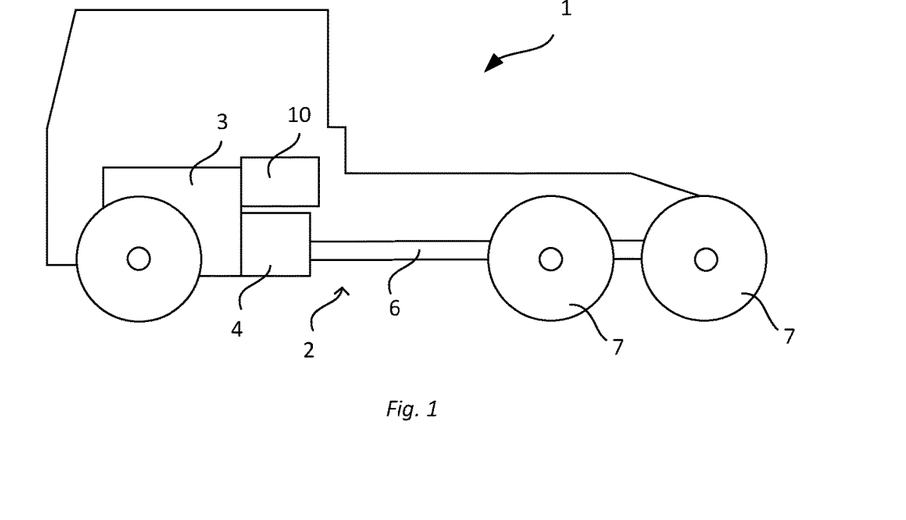
FIG. 1 schematically illustrates a side view of an example of a vehicle.

FIG. 1 schematically illustrates a side view of an example of a vehicle 1. The vehicle 1 comprises a powertrain 2 comprising an internal combustion engine 3 and a gearbox 4. The gearbox 4 is connected to the driving wheels 7 of the vehicle 1 via a propeller shaft 6. The vehicle 1 further comprises an exhaust system 10 connected to the combustion engine 3. The exhaust system 10 is configured to treat the exhaust gas leaving the combustion engine 3. The vehicle 1 may optionally be a hybrid vehicle, in which case the vehicle comprises an electrical machine (not shown) in addition to the combustion engine 3. The vehicle 1 may be a heavy vehicle, such as a bus or a truck.

Figure 2:
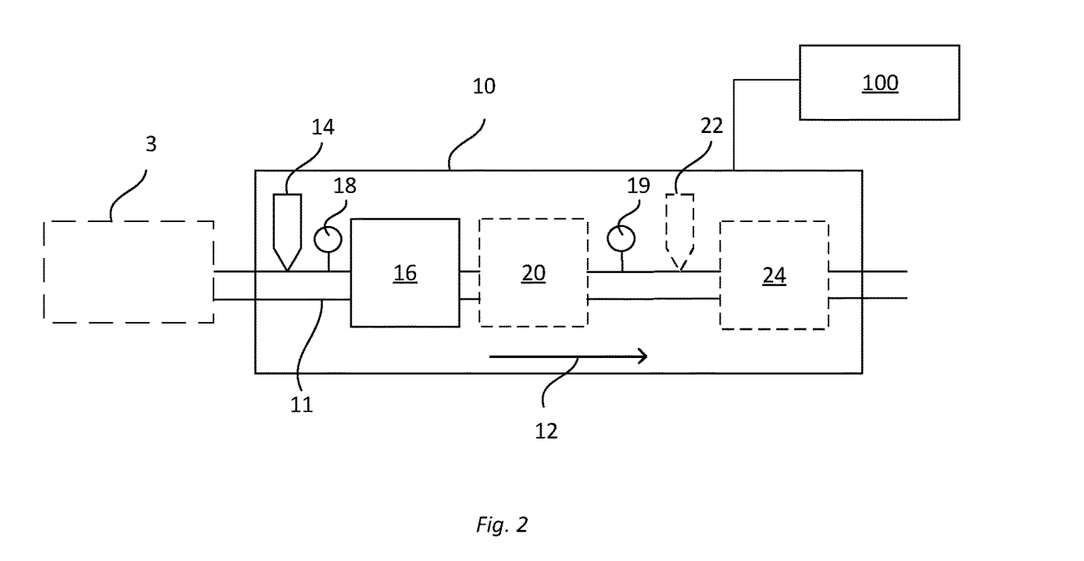
FIG. 2 schematically illustrates one exemplifying embodiment of an exhaust system, FIG. 3 schematically illustrates a part of another exemplifying embodiment of an exhaust system.

FIG. 2 schematically illustrates one exemplifying embodiment of an exhaust system 10. The herein described method for deriving engine-out NOx concentration may be used in or for the illustrated exhaust system 10. The exhaust system 10 is configured to treat exhaust gas generated by a combustion engine 3 of a vehicle, such as the vehicle 1 illustrated in FIG. 1, and may thus be connected to a combustion engine 3. The combustion engine 3 is not a part of the exhaust system 10 per se and is therefore illustrated by a dashed box in the figure. Similarly, optional features of the exhaust system 10 are illustrated by dashed boxes or lines.

The exhaust system comprises a conduit 11 through which the exhaust gas flows when passing through the exhaust system 10. The direction of flow of exhaust gas through the exhaust system 10 is illustrated by the arrow 12. The exhaust system 10 comprises a first selective catalytic reduction, SCR, catalyst 16. The first SCR catalyst 16 may be the very first catalyst of the exhaust system 10, which means that it is the first catalyst that the exhaust gas from the combustion engine 3 reaches within the exhaust system 10. The first SCR catalyst 16 is configured to convert NOx into $N_2$ and water, and thereby reduce the NOx concentration in the exhaust gas. For said purpose, a reducing agent is injected into the exhaust gas upstream of the SCR. The reducing agent may typically be an aqueous ammonia or urea solution. For the purpose of injecting the reducing agent upstream of the first SCR 16, the exhaust system 10 comprises a first dosing device 14 configured to introduce said reducing agent into the exhaust gas stream. By means of controlling the dosage of the reducing agent, the amount of reduction of NOx in the SCR may be controlled. Controlling a dosage of reductant to an SCR to arrive at a desired reduction of NOx concentration is as such well known to a person skilled in the art and will therefore not be further described in the present disclosure.

The exhaust system 10 may further comprise an ammonia slip catalyst 20 arranged downstream of the first SCR 16. Such an ammonia slip catalyst may be configured to treat any excess ammonia not consumed in the first SCR 16.

The exhaust system 10 comprises a first NOx sensor 18 arranged upstream of the first SCR 16. The first NOx sensor 18 is arranged downstream of the position where a reductant is introduced into the exhaust gas stream by means of the first dosing device 14. The exhaust system 10 further comprises a second NOx sensor 19 arranged downstream of the first SCR 16.

The exhaust system 10 may, if desired, further comprise a second selective catalytic reduction catalyst 24 arranged downstream of the first selective catalytic reduction catalyst 16. In such a case, the exhaust system 10 may also comprise a second dosing device 22 configured to introduce a reducing agent into the exhaust gas stream upstream of the second SCR 24. If present, the second dosing device 22 may be arranged downstream of the first SCR 16. The second dosing device 22 may also be arranged downstream of the second NOx sensor 19 as illustrated in the figure.

Although not illustrated in the figure, the exhaust system 10 may comprise further catalysts and/or filters. For example, the exhaust system may further comprise a diesel particulate filter, DPF. Such a DPF may suitably be a catalytic diesel particulate filter, cDPF. A DPF may for example be arranged downstream of the first SCR 16. If a second SCR 24 is present, the DPF may suitably be arranged upstream of the second SCR 24.

The exhaust system 10 may further comprise or be connected to a control device 100 configured to derive an engine-out NOx concentration of an exhaust gas stream in the exhaust system 10. In other words, the control device 100 may be a part of exhaust system 10 as such, or be remote from the exhaust system 10. The control device 100 may comprise one or more control units. In case of the control device comprising a plurality of control units, each control unit may be configured to control a certain function or a certain function may be divided between more than one control units.

Figure 3:
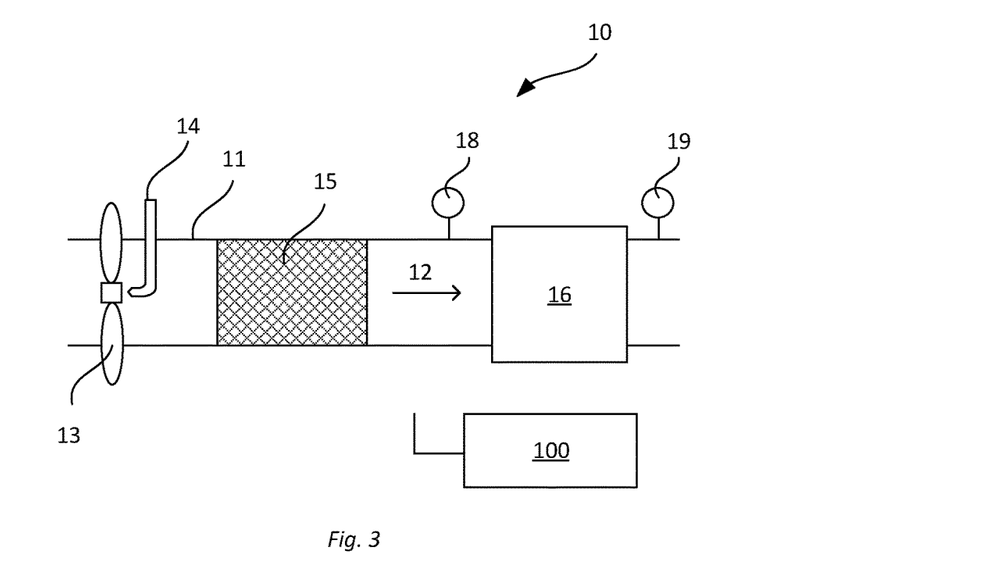

FIG. 3 schematically illustrates a part of another exemplifying embodiment of an exhaust system 10. The exhaust system 10 according to this exemplifying embodiment may have the same configuration as the exemplifying embodiment described above and shown in FIG. 2, except that the exhaust system 10 further comprises a turbocharger 13 and the first dosing device 14 is adapted to inject the reductant towards said turbocharger 13. The turbocharger 13 may suitably be a turbocharger associated with the combustion engine (such a combustion engine illustrated in FIG. 2) whose exhaust gas the exhaust system 10 is configured to treat. The fact that dosing of reductant is performed towards the turbocharger 13 allows for utilizing the rotational motion of a turbine of the turbocharger to (directly or indirectly as described above) contribute to the dispersion of reductant in the exhaust gas stream. This in turn significantly improves the efficiency in the conversion of NOx in the first SCR 16, and thus in lower emissions thereof from the exhaust gas leaving the exhaust system 10.

FIG. 3 further schematically illustrates an evaporation zone 15 formed by the conduit 11 downstream of the first dosing device 14. Said evaporation zone may suitably have a sufficient length for allowing essentially all of the reductant to be evaporated. The first NOx sensor may suitably be arranged downstream of said evaporation zone 15. In other words, the first NOx sensor is suitably arranged at a position in the exhaust system 10 where it is expected that the reductant is essentially fully evaporated.

Figure 4:
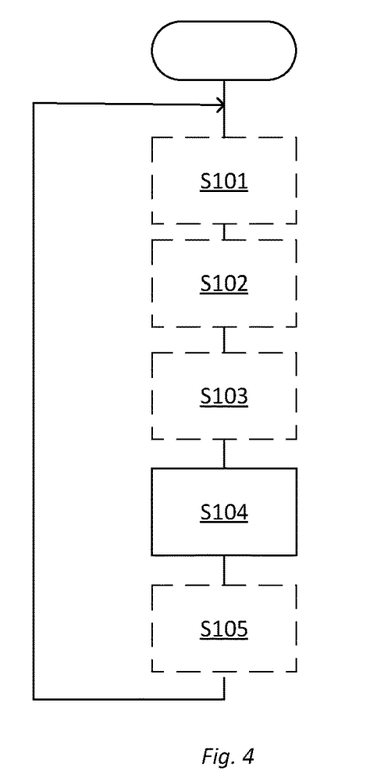
FIG. 4 represents a flowchart schematically illustrating an exemplifying embodiment of the method for deriving engine-out NOx concentration according to the present disclosure, FIG. 5 schematically illustrates a device that may constitute, comprise or be a part of a control device configured derive an engine-out NOx concentration of an exhaust gas stream in an exhaust system configured to treat exhaust gas from a combustion engine.

FIG. 4 represents a flowchart schematically illustrating an exemplifying embodiment of the method for deriving engine-out NOx concentration according to the present disclosure. Optional features of the exemplifying embodiment of the method are illustrated by dashed boxes.

The method may comprise a first step S101 of, while the dosing device is in operation so as to introduce reductant into an exhaust gas stream in the exhaust system, requesting a first concentration reading from the first NOx sensor. Step S101 may thus result in obtaining a first concentration reading from the first NOx sensor.

The method may further comprise a second step S102 of requesting a second concentration reading from the second NOx sensor. Step S102 may thus result in obtaining a second concentration reading from the second NOx sensor.

The method may further comprise a third step S103 of obtaining information of the amount of dosed reductant into the exhaust gas stream. Step 103 may further comprise converting the value of the dosed amount of reductant into a NOx equivalent.

The method comprises a step S104 of deriving (more specifically calculating) engine-out NOx concentration based on a first concentration reading obtained from the first NOx sensor (e.g. resulting from step S101), a second concentration reading obtained from the second NOx sensor (e.g. resulting from step S102), and information regarding controlled amount of reductant introduced into the exhaust gas stream (e.g. resulting from step S103). The first concentration reading, used in step S104, is obtained from the first NOx sensor while the dosing device is in operation so as to introduce a controlled amount reductant into the exhaust gas stream, said controlled amount corresponding to the information regarding controlled amount of reductant introduced used when deriving engine-out NOx concentration.

The method may further comprise a step S105 of storing the derived engine-out NOx concentration in a database or the like, optionally together with further information such as a time-stamp, information relating to a corresponding operation of a combustion engine connected to the exhaust system, and/or data regarding operating parameters of the exhaust system.

The method may thereafter be returned to start so as to be repeated. Alternatively, the method may be ended, if desired. Typically, the method may be repeated as long as the exhaust system is in the normally intended operation and ended when the exhaust system is not in operation (e.g. when there is no exhaust gas flowing through the exhaust system). Such repeating of the method may also, if desired, be temporarily interrupted in situations where the exhaust system is not operated in the normally intended operation, for example due to regeneration of a constituent component thereof or due to failure diagnostics of a constituent component thereof.

Figure 5:
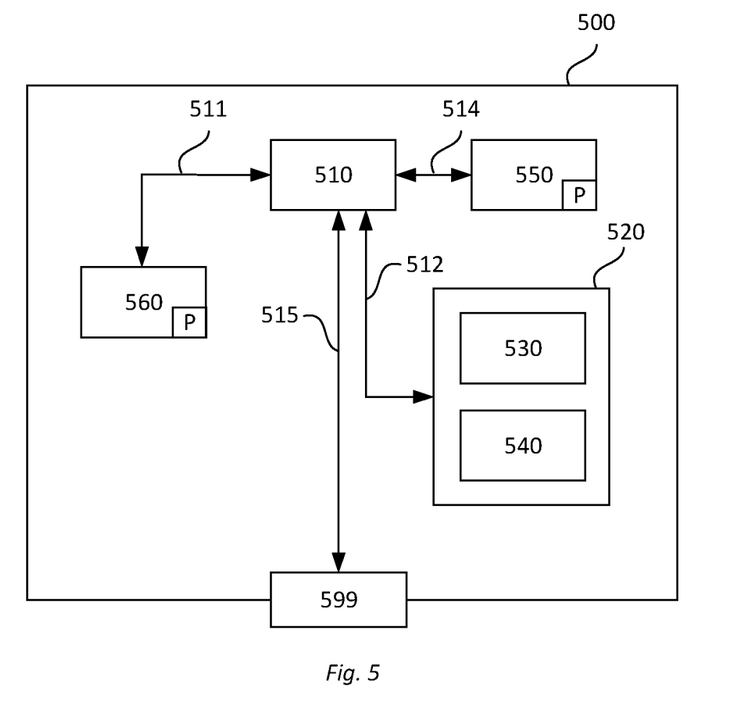

FIG. 5 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for deriving an engine-out NOx concentration of an exhaust gas stream in an exhaust system configured to treat exhaust gas from a combustion engine. Said exhaust system comprises a selective catalytic reduction catalyst, a dosing device adapted for injecting a reductant into the exhaust gas stream, a first NOx sensor arranged downstream of the dosing device but upstream of the selective catalytic reduction catalyst, and a second NOx sensor arranged downstream of the selective catalytic reduction catalyst. The computer program comprises instructions for deriving engine-out NOx concentration based on a first concentration reading obtained from the first NOx sensor and a second concentration reading obtained from the second NOx sensor, said first concentration reading being obtained while the dosing device is in operation so as to introduce reductant into the exhaust gas stream. The computer program may further comprise instructions for taking into account a controlled amount of reductant introduced into the exhaust gas stream via the dosing device when deriving engine-out NOx concentration based on the first concentration reading obtained from the first NOx sensor and the second concentration reading obtained from the second NOx sensor.

The program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The invention claimed is:

1. A method, performed by a control device, for deriving an engine-out NOx concentration of an exhaust gas stream in an exhaust system configured to treat exhaust gas from a combustion engine,
   wherein the exhaust system comprises:
      a turbocharger;
      a selective catalytic reduction catalyst arranged downstream of the turbocharger;
      a dosing device adapted for injecting a reductant either towards or in the turbocharger, such that the reductant is dispersed in the exhaust gas stream by usage of a rotational motion of a turbine of the turbocharger;
      a first NOx sensor arranged downstream of the dosing device but upstream of the selective catalytic reduction catalyst; and
      a second NOx sensor arranged downstream of the selective catalytic reduction catalyst,
   wherein the method comprises:
      deriving engine-out NOx concentration based on both a first concentration reading obtained from the first NOx sensor and a second concentration reading obtained from the second NOx sensor, said first concentration reading being obtained while the dosing device is in operation so as to introduce reductant into the exhaust gas stream, wherein the first concentration reading is obtained from the first NOx sensor at a first point in time, and the second concentration reading is obtained from the second NOx sensor at a second point in time, and wherein the second point in time is after a time, corresponding to an estimated time for the exhaust gas stream to travel from the first NOx sensor to the second NOx sensor, has elapsed since the first point in time; and
      controlling a dosage of reductant injected into the exhaust treatment system using the derived engine-out NOx concentration.

2. The method according to claim 1, wherein the first NOx sensor is arranged at a position in the exhaust system where it is expected that the reductant is evaporated.

3. The method according to claim 1, wherein deriving engine-out NOx concentration based on both the first concentration reading and the second concentration reading is performed by also taking into account a controlled amount of reductant introduced into the exhaust gas stream via the dosing device.

4. The method according to claim 1, wherein deriving engine-out NOx concentration based on both the first concentration reading and the second concentration reading is performed while taking into account a predetermined constant representing the sensitivity of the first NOx sensor to the reductant.

5. The method according to claim 1, wherein the exhaust system further comprises an ammonia slip catalyst arranged: (i) downstream of the selective catalytic reduction catalyst, and (ii) upstream of the second NOx sensor.

6. A computer program product stored on a non-transitory computer-readable medium, said computer program product for deriving an engine-out NOx concentration of an exhaust gas stream in an exhaust system configured to treat exhaust gas from a combustion engine, wherein the exhaust system comprises: a turbocharger; a selective catalytic reduction catalyst; a dosing device adapted for injecting a reductant either towards or in the turbocharger, such that the reductant is dispersed in the exhaust gas stream by usage of a rotational motion of a turbine of the turbocharger; a first NOx sensor arranged downstream of the dosing device but upstream of the selective catalytic reduction catalyst; and a second NOx sensor arranged downstream of the selective catalytic reduction catalyst, wherein said computer program product comprising computer instructions to cause one or more control devices to perform the following operations:

derive engine-out NOx concentration based on both a first concentration reading obtained from the first NOx sensor and a second concentration reading obtained from the second NOx sensor, said first concentration reading being obtained while the dosing device is in operation so as to introduce reductant into the exhaust gas stream, wherein the first concentration reading is obtained from the first NOx sensor at a first point in time, and the second concentration reading is obtained from the second NOx sensor at a second point in time, and wherein the second point in time is after a time, corresponding to an estimated time for the exhaust gas stream to travel from the first NOx sensor to the second NOx sensor, has elapsed since the first point in time; and control a dosage of reductant injected into the exhaust treatment system based on the derived engine-out NOx concentration.

7. A control device configured to derive an engine-out NOx concentration of an exhaust gas stream in an exhaust system configured to treat exhaust gas from a combustion engine, wherein the exhaust system comprises:
a turbocharger;
a selective catalytic reduction catalyst arranged downstream of the turbocharger;
a dosing device adapted for injecting a reductant either towards or in the turbocharger, such that the reductant is dispersed in the exhaust gas stream by usage of a rotational motion of a turbine of the turbocharger;
a first NOx sensor arranged downstream of the dosing device but upstream of the selective catalytic reduction catalyst; and
a second NOx sensor arranged downstream of the selective catalytic reduction catalyst, wherein the control device is configured to:
derive engine-out NOx concentration based on both a first concentration reading obtained from the first NOx sensor and a second concentration reading obtained from the second NOx sensor, said first concentration reading being obtained while the dosing device is in operation so as to introduce reductant into the exhaust gas stream, wherein the first concentration reading is obtained from the first NOx sensor at a first point in time, and the second concentration reading is obtained from the second NOx sensor at a second point in time, and wherein the second point in time is after a time, corresponding to an estimated time for the exhaust gas stream to travel from the first NOx sensor to the second NOx sensor, has elapsed since the first point in time; and control a dosage of reductant injected into the exhaust treatment system based on the derived engine-out NOx concentration.

8. The control device according to claim 7, further configured to take into account a controlled amount of reductant introduced into the exhaust gas stream via the dosing device when deriving the engine-out NOx concentration based on both the first concentration reading obtained from the first NOx sensor and the second concentration reading obtained from the second NOx sensor.

9. The control device according to claim 7, wherein the first NOx sensor is arranged at a position in the exhaust system where it is expected that the reductant is evaporated.

10. The control device according to claim 7, wherein deriving engine-out NOx concentration based on both the first concentration reading and the second concentration reading is performed while taking into account a predetermined constant representing the sensitivity of the first NOx sensor to the reductant.

11. The control device according to claim 7, wherein the exhaust system further comprises an ammonia slip catalyst arranged: (i) downstream of the selective catalytic reduction catalyst, and (ii) upstream of the second NOx sensor.

12. An exhaust system configured to treat exhaust gas from a combustion engine, the exhaust system comprising:
a turbocharger;
a selective catalytic reduction catalyst arranged downstream of the turbocharger;
a dosing device adapted for dosing a reductant either towards or in the turbocharger, such that the reductant is dispersed in the exhaust gas stream by usage of a rotational motion of a turbine of the turbocharger;
a first NOx sensor arranged downstream of the dosing device but upstream of the selective catalytic reduction catalyst;
a second NOx sensor arranged downstream of the selective catalytic reduction catalyst; and
a control device configured to derive an engine-out NOx concentration of an exhaust gas stream in the exhaust system, wherein the control device is configured to:
derive engine-out NOx concentration based on both a first concentration reading obtained from the first NOx sensor and a second concentration reading obtained from the second NOx sensor, said first concentration reading being obtained while the dosing device is in operation so as to introduce reductant into the exhaust gas stream, wherein the first concentration reading is obtained from the first NOx sensor at a first point in time, and the second concentration reading is obtained from the second NOx sensor at a second point in time, and wherein the second point in time is after a time, corresponding to an estimated time for the exhaust gas stream to travel from the first NOx sensor to the second NOx sensor, has elapsed since the first point in time; and
control a dosage of reductant injected into the exhaust treatment system based on the derived engine-out NOx concentration.

13. A vehicle comprising a control device, wherein the control device is configured to derive an engine-out NOx concentration of an exhaust gas stream in an exhaust system configured to treat exhaust gas from a combustion engine,
wherein the exhaust system comprises:
a turbocharger;
a selective catalytic reduction catalyst arranged downstream of the turbocharger;

a dosing device adapted for injecting a reductant either towards or in the turbocharger, such that the reductant is dispersed in the exhaust gas stream by usage of a rotational motion of a turbine of the turbocharger;

a first NOx sensor arranged downstream of the dosing device but upstream of the selective catalytic reduction catalyst; and a second NOx sensor arranged downstream of the selective catalytic reduction catalyst, wherein the control device is configured to:

derive engine-out NOx concentration based on both a first concentration reading obtained from the first NOx sensor and a second concentration reading obtained from the second NOx sensor, said first concentration reading being obtained while the dosing device is in operation so as to introduce reductant into the exhaust gas stream, wherein the first concentration reading is obtained from the first NOx sensor at a first point in time, and the second concentration reading is obtained from the second NOx sensor at a second point in time, and wherein the second point in time is after a time, corresponding to an estimated time for the exhaust gas stream to travel from the first NOx sensor to the second NOx sensor, has elapsed since the first point in time; and control a dosage of reductant injected into the exhaust treatment system based on the derived engine-out NOx concentration.

* * * * *